United States Patent [19]
Lynn et al.

[11] 3,907,884
[45] Sept. 23, 1975

[54] FORMIC ACID SYNTHESIS BY LOWER ALKYL FORMATE HYDROLYSIS

[75] Inventors: James B. Lynn, Bethlehem; Otto A. Homberg, Easton; Alan H. Singleton, Emmaus, all of Pa.

[73] Assignee: Bethlehem Steel Corporation, Bethlehem, Pa.

[22] Filed: Apr. 6, 1973

[21] Appl. No.: 348,834

[52] U.S. Cl. .............................. 260/542; 260/638 R
[51] Int. Cl.² ......................................... C07C 51/00
[58] Field of Search ................... 260/542, 540, 541

[56] References Cited
UNITED STATES PATENTS

| | | | |
|---|---|---|---|
| 2,070,503 | 2/1937 | Ammon | 260/542 |
| 2,160,064 | 5/1939 | Eversale | 260/542 |
| 2,373,583 | 4/1945 | Lader | 260/542 |

*Primary Examiner*—Vivian Garner
*Attorney, Agent, or Firm*—Joseph J. O'Keefe; Charles A. Wilkinson

[57] ABSTRACT

Formates of one to four carbon alkanols, preferably methyl formate, are hydrolyzed autocatalytically to formic acid with substantial reduction in reaction time. The process involves establishing and maintaining a single phase within the liquid components during hydrolysis by preselecting composition ratios.

19 Claims, 2 Drawing Figures

FORMIC ACID SYNTHESIS BY LOWER ALKYL FORMATE HYDROLYSIS

BACKGROUND OF THE INVENTION

1. Field of the Invention

This invention relates to carboxylic acids and more particularly to the synthesis of formic acid from methyl formate.

2. Prior Art

The production of formic acid on a commercial scale has historically been an example of the difficulty of transferring a simple laboratory procedure from the laboratory to a multimillion pound per year commercial operation. Early attempts at commercialization of such procedures are shown, for example, in U.S. Pat. No. 1,919,851, utilized a synthesis route in which a metal formate was reacted with a strong acid such as nitric acid to produce formic acid. More recent proposals for formic acid synthesis have tended toward the utilization of formate esters. Transesterification was proposed as a synthesis route in U.S. Pat. No. 2,373,583 and cracking of high weight tertiary formates is disclosed in U.S. Pat. No. 2,286,407. These later two inventions were responses to two problems associated with formic acid synthesis — volatility of the reactants and/or product, and the propensity of formic acid to form a constant boiling azeotrope with water.

Attempts to produce formic acid cheaply by the hydrolysis of formate esters of one to four carbon alkanols, principally methyl formate, (which is available in large quantities from carbon monoxide esterification) have encountered problems not only of volatility and azeotrophy, but also two major additional problems. First, the chemical equilibrium in the hydrolysis reaction:

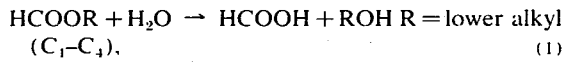

$$HCOOR + H_2O \rightarrow HCOOH + ROH \quad R = \text{lower alkyl} \quad (C_1-C_4), \tag{1}$$

does not equilibrate in favor of the formation of the acid. This unfavorable equilibrium state means that excessive amounts of starting material must be employed to force the hydrolysis. A second and even more detrimental problem is related to the time required for the equilibrium of the equation (1) reaction to be established. Even with the use of a mineral acid catalyst and high temperature, the residence time necessary to reach equilibrium is so extended that commercial scale methyl formate hydrolysis involves very complicated and expensive reactant recycling and product distillation. The complexity of recycling is exemplified in U.S. Pat. No. 2,160,064, while product distillation techniques are shown in Br. Pat. No. 628,656.

Furthermore, the use of a mineral acid catalyst, while it does reduce reaction time, has caused its own problems because the mineral acid catalyst also promotes the decomposition of the product formic acid to carbon monoxide and water, thereby reducing yields. Autocatalysis, utilizing formic acid itself, while known experimentally, has been ignored commercially because formic acid was in the past recognized to be a less effective catalyst than, for example, sulfuric acid in reducing the residence time required to reach reaction equilibrium. The need for a fast reaction rate far outweighs any other consideration in reducing costs in formic acid synthesis from methyl formate.

SUMMARY OF THE INVENTION

We have discovered a method which eliminates prior art inefficiencies in the hydrolysis of formate esters of one to four carbon alkanols to formic acid. In the process of this invention we are able to substantially reduce the reaction time for methyl formate hydrolysis, and to effect this time reduction regardless of the temperature at which the reaction is conducted. Further, in our method we are able to achieve reaction time reduction utilizing formic acid in an autocatalytic process, and thereby gain the advantage of elimination of mineral acid catalysts together with their inherent disadvantages.

Briefly, we have discovered that the reaction equilibrium time rate in formate hydrolysis is phase related. That is, we have discovered that if the hydrolysis is conducted in a solvent system preselected for the desired operational temperature so that only a single liquid phase is present during hydrolysis, we are able to reduce the time necessary to reach equilibrium by surprisingly large factors of up to about 50 fold or more for a given temperature.

In the practice of our invention, as will be described hereinafter in more detail, we have discovered that, by utilizing a preselected ratio of, for example, methanol and water as a solvent system we are able to effect a single liquid phase and thereby substantially reduce the time required to reach chemical equilibrium in methyl formate hydrolysis. For example with an initial composition of 72 mole percent water, 4 mole percent methanol and 24 mole percent methyl formate the reaction rate for methyl formate hydrolysis to formic acid at 60° C. has been shortened from 11,800 minutes to only 210 minutes, a 56 fold improvement. Further, we are able to achieve this reaction time reduction in the total absence of added catalysts.

It is therefore an object of this invention to simplify the production of formic acid from formate esters of one to four carbon alkanols, especially methyl formate, by reducing the reaction time.

It is a further object of this invention to achieve this reaction time reduction in the absence of any exocatalysts.

These and other objects and advantages will be readily ascertainable to those skilled in the art from a consideration of the drawings, description, and exemplary embodiments.

DESCRIPTION OF THE PREFERRED EMBODIMENT

Figure 1:
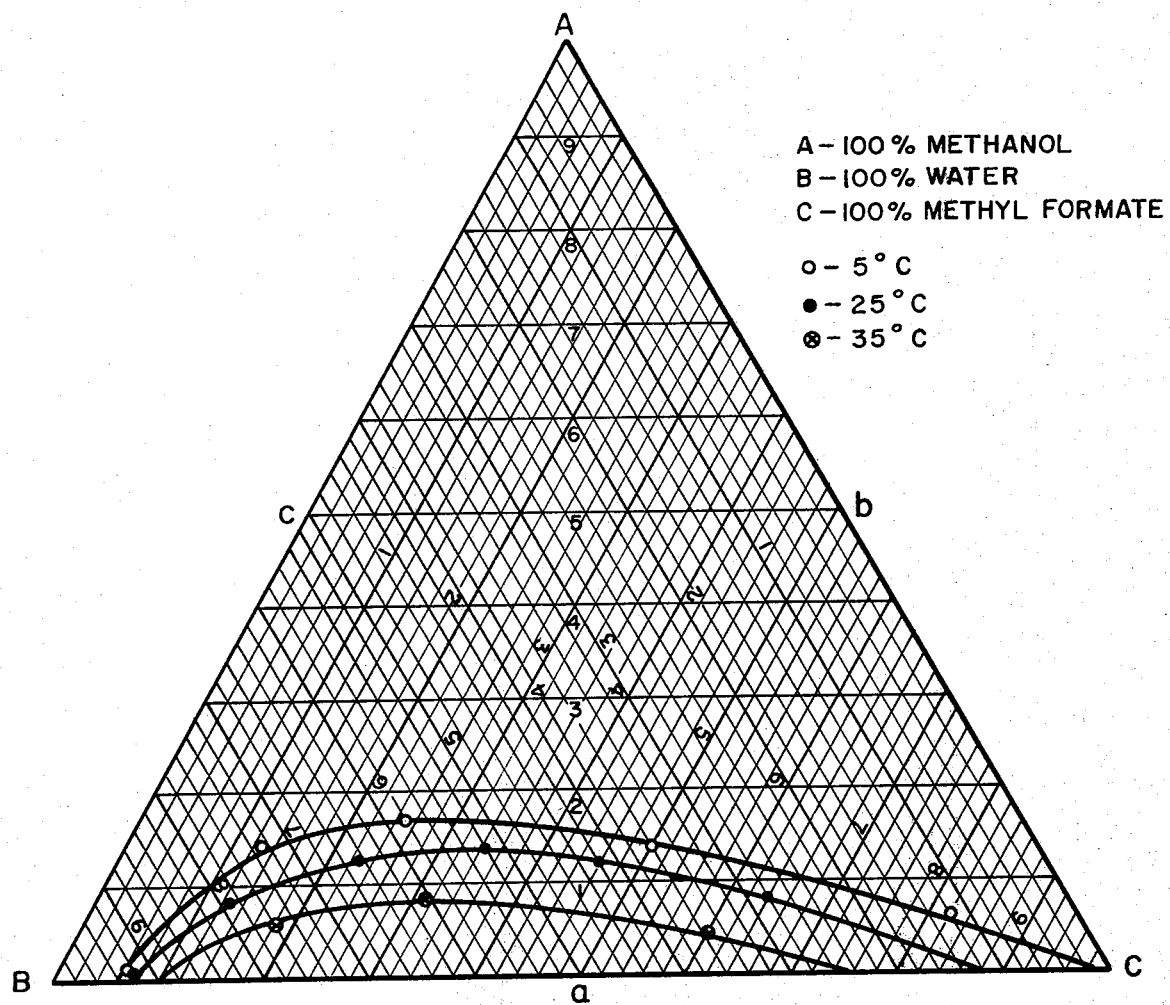
FIG. 1 is a phase diagram for a three component system of methanol, water and methyl formate.

The method of this invention may be practiced as either a batch or a continuous reaction.

Examples of both batch and continuous reactions are given below beginning with Example 1. In the practice of this invention by a batch process it is satisfactory to simply combine reactants and solvent or solvents in a stirred, or otherwise agitated, pressure reactor, maintained within a temperature range of 25° C. to 150° C. After sealing the reactor, heat is applied until the desired temperature of reaction (preferably 60°–150° C.)

is reached. Since the reaction is essentially complete when equilibrium is reached, the reaction may be terminated at that time. It has been established that equilibrium concentrations for methyl formate hydrolysis is given by the equation:

$$K = \frac{[\text{Formic Acid}][\text{Methanol}]}{[\text{Methyl Formate}][\text{Water}]}$$

where $K = 0.225 \pm 0.030$. Example 1 is illustrative of batch reaction utilizing methanol and water as co-solvents.

Example 1

A stainless steel pressure reactor was charged with 678 grams (72 mole parts) water, 71 grams (4 mole parts) methanol and 752 grams (24 mole parts) methyl formate and heated rapidly to 60° C., and the temperature was held at 60° C during reaction. The pressure rose to a high of about 25 psig. and ultimately equilibrated at 12 psig. After the lapse of only 210 minutes the reactor composition had reached an equilibrium mixture of 12 mole parts formic acid, 60 mole parts water, 15 mole parts methanol and 13 mole parts methyl formate. The use of a pressure reactor in Example 1 is dictated by the volatility of the reactants and products and is not necessitated by any need for application of pressure in the reaction.

Several batch reaction examples were run at different temperatures according to the Example 1 method and the results are given in Table I and Table II.

Table I compares the process of the invention and the prior art process at the same temperature for a range of temperature to demonstrate the degree of savings in establishing equilibrium by the method of this invention.

In Table I, the first column recites the maximum temperature of reaction, column 2 is the reaction time according to our method, column 3 gives the reaction time calculated from the first order reaction rate constants and the Arrhenius Activation Energy given in the literature (Zaheeruddin, etal., Pakistan, J. Sci., Ind., Res. 9 (3) 206-9 (1966). Column 4 gives the time improvement ratio which was calculated as column 3 time divided by column 2 time for the same temperature. All tests in Table I utilize an initial mole composition of 72% water, 4% methanol and 24% methyl formate.

Table I

| Temp. °C. | Time to Equilibrium | | Order of Magnitude of Improvement over Prior Art |
|---|---|---|---|
| | Measured from Example 1 Method | Calculations from Prior Art | |
| (1) 25 | 3.0 days | 800 days | 267 |
| (2) 60 (Ex.1) | 210 min. | 11,800 min. | 56 |
| (3) 85 | 60 min. | 1,080 min. | 18 |
| (4) 100 | 30 min. | 236 min. | 8 |

Table I shows that, with the selection of a solvent system which gives a homogenous single phase liquid during the hydrolysis reaction it is possible to effect a large reduction in reaction time and to effect this time savings at every temperature at which the reaction is run.

The process of this invention is not limited to the approximate three to one water/methyl formate mixture of Example I. Experiments were run for methyl formate hydrolysis in which the initial compositions of water, methanol and methyl formate were varied and the final reaction compositions were compared. The hydrolysis reactions were conducted utilizing Example I procedure and the results are listed in Table II. The reaction temperature was about 85° C. in all five examples given in Table II and the data is given in mole percent.

TABLE II

| Initial Composition | | | Time to Equilibrium | Formic Acid | Final Composition | | |
|---|---|---|---|---|---|---|---|
| Water | Methanol | Formate | | | Water | Methanol | Formate |
| 48.5 | 3 | 48.5 | 2 hrs. | 11.5 | 37 | 20.5 | 31 |
| 68 | 2 | 30 | 1 hr. | 14 | 54 | 16 | 16 |
| 84 | 1 | 15 | 2 hrs. | 9 | 75 | 10 | 6 |
| 30 | 4 | 66 | 2 hrs. | 13 | 17 | 17 | 53 |
| 10 | 5 | 85 | 3.5 hrs. | 6 | 4 | 10 | 80 |

Table II demonstrates that, so long as a homogenous liquid phase is present, the process occurs over wide ranges in the system composition. We have found that ranges of water to ester ratios of from 1:10 to 10:1 and alcohol content of from 3–30 weight percent are satisfactory for our process. However, for optimum rate of reaction and concentration of formic acid the reaction is preferably conducted between 3:1 and 1:3 mole ratios of water-methyl formate and with a 10 weight percent methanol in the charge.

The selection of a solvent system suitable for the process of this invention may depend on several variables. For example, in the methyl formate hydrolysis, a methanol and water system is very satisfactory, but the exact range of ratios of water and metnanol required to give a single liquid phase depends on the temperature at which the reaction is run as well as the composition of the charge. A means of selecting an appropriate composition for various temperatures and charge is illustrated in FIG. 1.

FIG. 1 shows the experimental phase diagrams for the three component system of water, methanol and methyl formate at three temperatures. The portions above the curve delineate compositions where a single homogenous phase is present at the temperature specified. The regions below the curve are areas where, at the temperature specified, a two liquid phase system exists. It is evident that with increasing temperature there is a decrease in the area of the two phase region.

It should be appreciated that the mole percent composition of components of the hydrolysis change during the hydrolysis.

Referring again to Equation 1:

$$HCOOCH_3 + H_2O \rightarrow HCOOH + CH_3OH \quad R = CH_3 \tag{1}$$

It is readily apparent from the above equation that water and methyl formate are being consumed during reaction, producing formic acid and methanol. Therefore, in addition to the temperature at which the reaction is run, another contributing factor relating to phase homogeneity is the changing mole ratio of the components during the course of the hydrolysis. The disappearance of methyl formate and the appearance of methanol and formic acid, which is miscible with all the components of the system, would drive the system deeper into the homogenous region. Thus, it is only necessary that the system be homogenous at the start of the reaction to insure homogeneity throughout the course of the reaction.

Figure 2:
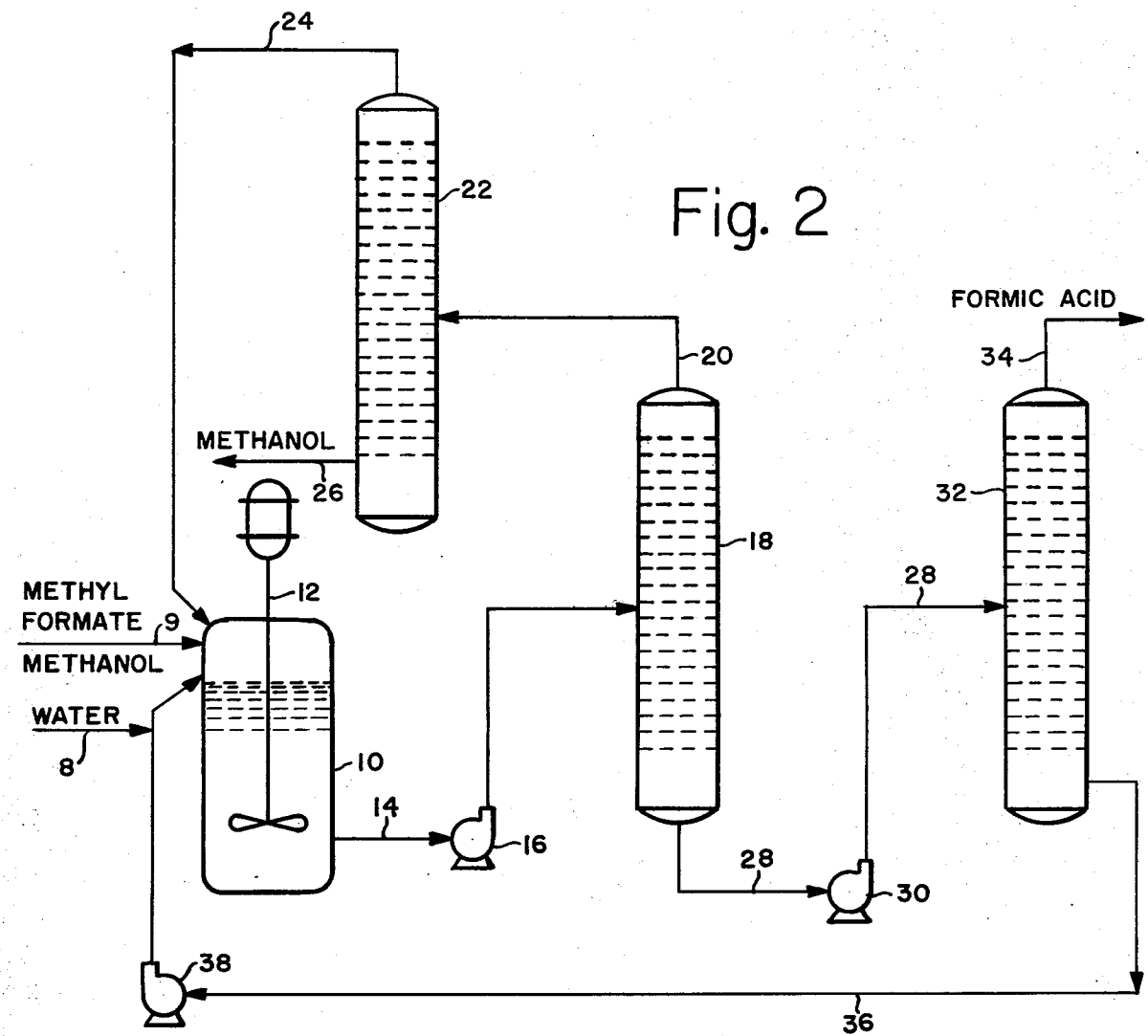
FIG. 2 is a schematic diagram of the process of this invention illustrating a large scale continuous process.

Although our process may be conducted with ease and simplicity as a batch reaction, its greatest usefulness lies in its adaptability to a large scale continuous reaction. FIG. 2 is a schematic representation illustrative of a large scale process, wherein a methanol/water solvent system was employed for the hydrolysis of methyl formate.

Referring now to FIG. 2, methanol, methyl formate and water, either fresh or recycled, as will be disclosed more fully hereinafter, enters stainless steel pressure reactor 10 from lines 9, 8, 36 and 24. The stream composition in kilogram/minute (Kg/min.) is as follows: line 9 supplies 135 Kg/min. methyl formate and 20 Kg/min. methanol, line 24 supplies 170 Kg/min. methyl formate and 10 Kg/min. methanol, line 8 supplies 58 Kg/min. water, and line 36 supplies 216 Kg/min. water. In reactor 10 propeller assembly 12 maintains constant agitation. In reactor 10 the methyl formate hydrolysis reaction is conducted at temperatures of about 78° C. to about 82° C. under a pressure of about 29 psia. to give a product stream which is withdrawn at 14, and pumped by pump 16 to a product splitter distillation column 18.

The composition leaving reactor 10 and entering column 18 has a composition of about 170 Kg/min. methyl formate, 102 Kg/min. methanol, 234 Kg/min. water and 103 Kg/min. formic acid. In column 18 the entering product stream is distilled and a methyl formate/methanol stream emerges overhead at 20 having a composition of 170 Kg/min. methyl formate and 102 Kg/min. methanol. The methyl formate/methanol stream passes into distillation column 22 where a further distillation produces methyl formate for recycle emerging at the overhead in line 24 and bottoms of 92 Kg/min. methanol emerging in line 26. Column 18 may comprise any suitable distillation column such as, for example, a bubble-cap plate tower or the like.

Referring back to column 18, bottoms comprising a formic acid/water rich solution of about 234 Kg/min. water and 103 Kg/min. formic acid pass by line 28, and are pumped by pump 30 to distillation column 32. Distillation column 32 is of a type which may be operated under pressure and the input is distilled at about 3 atmospheres to yield about an 85% formic acid product (103 Kg/min. formic acid and 18 Kg/min. water) as an overhead which exits the system by line 34 and water as bottoms which is recycled by line 36, and pump 38 to be used in reactor 10.

It should also be appreciated that the process illustrated and described in FIG. 2 describes the process of this invention under steady state conditions. Naturally when the process is begun the reactant input to reactor 10 will have to be adjusted to supply the total components needed without the input from the recycle from line 36 and line 24.

There are many variations contemplated within the scope of this invention.

While we have illustrated the process utilizing the methyl formate/methanol/water system it is possible to utilize other systems, such as for example ethyl formate/ethanol/water or propyl formate/propanol/water or other $C_1$–$C_4$ alkyl systems. Any ester/alcohol systems or any other chemical or process techniques which may be employed to effect a single liquid phase for $C_1$–$C_4$ alkyl formate hydrolysis fall within the scope of our inventive concept, so long as there are no deleterious effects on the reaction.

The process of this invention is unaffected by the pressure at which the reaction is run. Pressure develops in the system as a result of the volatility of reactants and products. Conversely, the reaction may be run under pressure, if such is desired or dictated by the type of apparatus selected.

The amount of formic acid catalyst which is effective in the process of this invention varies widely. A minimum of about one mole percent should be used if our process is autocatalytic. There is no meaningful upper limit on the catalyst since formic acid is the desired product as well as the catalyst. While, we have shown that there is no need to use any other catalyst if our process is utilized, the presence of the prior art mineral acid catalysts would be acceptable if such is desired, and the amount utilized does not adversely effect the reaction chemistry or the single phase system.

We claim:

1. A process for the manufacture of formic acid from a formate ester of an alkanol containing 1–4 carbon atoms comprising:

reacting, in a homogeneous liquid phase maintained within a temperature range of 25° C. to 150° C., an alkyl formate ester in which the alkyl constituent contains 1–4 carbon atoms, and water in a hydrolysis reaction to form formic acid and a corresponding 1–4 carbon alkanol, said liquid phase being maintained by the inclusion, in the reaction mixture, of sufficient 1–4 carbon alkanol to establish a homogeneous liquid system at the reaction temperature.

2. A process according to claim 1 in which formic acid is included in the reaction mixture prior to the hydrolysis reaction.

3. A process according to claim 1 in which the 1–4 carbon aliphatic alcohol is methanol and the formate ester is methyl formate.

4. A process according to claim 3 in which the reaction temperature is within a range of about 60° C. to about 150° C.

5. A process according to claim 4 in which the 1–4 carbon alkanol included to establish a homogenous liquid system corresponds to the 1–4 carbon alkyl constituent of the formate ester.

6. A process according to claim 3 in which the reaction temperature is within a range of 25° C. to about 100° C.

7. A process according to claim 6 in which the initial mole ratio of water to methyl formate is between about 3:1 and 1:3 and the methanol is from about 3 to 30 weight percent of the charge.

8. A process for the manufacture of formic acid from a formate ester of an alkanol containing 1–4 carbon atoms comprising:

reacting, in a homogeneous liquid phase maintained within a temperature range of 25° C. to 150° C., an alkyl formate ester in which the alkyl constituent contains 1–4 carbon atoms, and water in a hydrolysis reaction to form formic acid and a corresponding 1–4 carbon, alkanol, said liquid phase being maintained by the inclusion, in the reaction mixture, of sufficient 1–4 carbon alkanol to establish a homogeneous liquid system at the reaction temperature, and maintaining at least some formic acid, generated during said reaction, in the liquid phase during said hydrolysis, whereby said formic acid functions as a catalyst for said hydrolysis reaction.

9. A process according to claim 8 in which at least some formic acid formed is retained, within said liquid phase until said hydrolysis is complete.

10. A process according to claim 8 in which formic acid is included in the reaction mixture prior to the hydrolysis reaction.

11. A process according to claim 8 in which the 1–4 carbon aliphatic alcohol is methanol and the formate ester is methyl formate.

12. A process according to claim 11 in which the reaction temperature is within a range of about 60° C. to about 150° C.

13. A process according to claim 12 in which the 1–4 carbon alkanol included to establish a homogenous liquid system corresponds to the 1–4 carbon alkyl constituent of the formate ester.

14. A process according to claim 11 in which the reaction temperature is within a range of about 25° C. to about 100° C.

15. A process according to claim 14 in which the initial mole ratio of water to methyl formate is between about 3:1 to 1:3 and the methanol is from about 3 to 30 weight percent of the charge.

16. A process for the manufacture of formic acid from methyl formate comprising:

reacting in a homogenous liquid phase, methyl formate and water in the mole ratio of water to methyl formate of from about 3:1 to 1:3 in the presence of from about 3 to about 30 weight percent methanol at a temperature of from about 60° C. to 150° C. to form formic acid.

17. A continuous process for the manufacture of formic acid from a formate ester of alkanol containing 1–4 carbon atoms comprising:

a. reacting, in a homogeneous liquid phase maintained within a temperature range of 25° C. to 150° C., an alkyl formate ester, which alkyl constituent contains 1–4 carbon atoms, and water in hydrolysis reaction to form formic acid and a corresponding, 1–4 carbon, alkanol, said liquid phase being maintained by the inclusion, in the reaction mixture, of sufficient 1–4 carbon alkanol to establish a homogeneous liquid system at the reaction temperature, and maintaining at least some formic acid, generated during said reaction, in the liquid phase during said hydrolysis, whereby said formic acid functions as a catalyst for said hydrolysis reaction;

b. removing from said liquid system a crude product stream containing formic acid, water alkyl formate starting material and 1–4 carbon alkanol;

c. distilling said product stream to produce an enriched 1–4 carbon alkanol and alkyl formate, said alkyl group containing 1–4 carbon atoms, rich recycle stream and a refined formic acid and water stream;

d. removing at least some of the alcohol from said recycle stream to produce an enriched alkyl formate stream;

e. returning said enriched alkyl formate stream to said hydrolysis reaction.

18. A process according to claim 17 in which the 1–4 carbon alkanol is methyl formate.

19. A process according to claim 18 in which the hydrolysis reaction mole ratio of water to methyl formate is between about 3:1 and 1:3, and methanol is present in the charge from about 3 to about 30 weight percent.

* * * * *